United States Patent
Kurihara

(10) Patent No.: US 7,586,651 B2
(45) Date of Patent: Sep. 8, 2009

(54) IMAGE FORMATION WITH PRIORITY SELECTION OF CORRECTION TABLE BASED ON MATCH WITH PRINT SHEET SETTING INFORMATION

(75) Inventor: Hideaki Kurihara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 648 days.

(21) Appl. No.: 11/290,502

(22) Filed: Dec. 1, 2005

(65) Prior Publication Data

US 2006/0119874 A1 Jun. 8, 2006

(30) Foreign Application Priority Data

Dec. 8, 2004 (JP) .............................. 2004-355893

(51) Int. Cl.
H04N 1/40 (2006.01)
G06K 15/02 (2006.01)

(52) U.S. Cl. .................... 358/3.23; 358/3.24; 358/1.13; 358/406; 358/504

(58) Field of Classification Search .................. 358/1.9, 358/3.23, 3.24, 1.13, 1.15, 504, 518, 523, 358/527, 406, 468, 296
See application file for complete search history.

(56) References Cited

U.S. PATENT DOCUMENTS

| 5,936,741 | A | 8/1999 | Burns | |
|---|---|---|---|---|
| 7,145,677 | B2 * | 12/2006 | Shimbori et al. | ............. 358/1.9 |
| 7,268,897 | B1 * | 9/2007 | Moro et al. | ................ 358/1.13 |
| 7,271,933 | B2 * | 9/2007 | Kato et al. | .................... 358/1.9 |
| 7,440,135 | B2 * | 10/2008 | Arai et al. | ...................... 358/1.9 |
| 2003/0016259 | A1 * | 1/2003 | Otokita | ........................ 347/14 |
| 2004/0057063 | A1 | 3/2004 | Toyofuku et al. | |
| 2005/0007608 | A1 | 1/2005 | Yamamoto et al. | |
| 2005/0213123 | A1 * | 9/2005 | Kobayashi | .................. 358/1.9 |
| 2005/0219630 | A1 * | 10/2005 | Tsuchiya et al. | ........... 358/3.23 |

FOREIGN PATENT DOCUMENTS

| JP | 2000-050074 | 2/2000 |
|---|---|---|
| JP | 2002-084433 | 3/2002 |
| JP | 2004-118277 | 4/2004 |
| JP | 2004-338098 | 12/2004 |

* cited by examiner

Primary Examiner—Scott A Rogers
(74) Attorney, Agent, or Firm—Fitzpatrick, Cella, Harper & Scinto

(57) ABSTRACT

An object of this invention is to reduce the work load of generating a correction LUT used to correct the tint. To achieve this object, an image forming system according to this invention has the following arrangement. That is, in an image forming system in which an information processing apparatus (105) and image forming apparatus (101) are communicably connected to each other, the information processing apparatus (105) has a function (103) of acquiring and displaying information on the type and size of a printing medium set in each sheet tray of the image forming apparatus (101), and a function (103) of selecting one of displayed sheet trays. The image forming apparatus (101) has a measurement image printing function of printing a measurement image (102) used to generate a correction table (106). The measurement image printing function prints the measurement image (102) at the type and size of a sheet corresponding to a selected sheet tray.

8 Claims, 13 Drawing Sheets

IMAGE FORMATION WITH PRIORITY SELECTION OF CORRECTION TABLE BASED ON MATCH WITH PRINT SHEET SETTING INFORMATION

FIELD OF THE INVENTION

The present invention relates to a processing technique for printing electronic data.

BACKGROUND OF THE INVENTION

When document data created on application software in a host computer is to be printed by an image forming apparatus such as a color printer, the document data is generally processed by the following procedures.

The document data is converted into a print job described in the PDL (Page Description Language) by a printer driver in the host computer. The print job is then transmitted to the color printer.

Upon reception of the print job, the color printer executes RIP (Raster Image Processing) for the print job by a controller to rasterize the print job into a bitmap image. The rasterized bitmap image is then sent to a print engine.

In general, there are various types of print engines used in color printers. For example, an electrophotographic print engine irradiates a photosensitive drum with light corresponding to an image signal from an exposure means such as a laser, and electrostatically develops with toner a latent image formed on the photosensitive drum. The print engine electrostatically transfers the toner image onto a sheet, and fuses and thermally fixes the toner image by a fixing means, forming the image on the sheet. Printing ends with the above processing.

The print engine changes the tint of an output image to be printed upon variations in use environment such as the air temperature or humidity, changes in the apparatus over time, deterioration of the performance of a member upon endurance, and the like. In order to obtain a stable output while suppressing variations in tint caused by these factors, various calibration techniques have been proposed for color printers.

The calibration technique includes many methods depending on the difference in the type of print engine, the difference in measurement means, and the like. Basically, a measurement sample which reflects the output characteristic of the print engine is printed by the print engine. The measurement sample is measured by any measurement means, and a correction table is created on the basis of the measurement result and target data having preset ideal reproducibility.

A print job transmitted from the host computer is corrected on the basis of the correction table in RIP or subsequent processing, and the contents of the correction table are reflected in final printing from the print engine.

In addition, the controller performs various image processes in RIP. In general, several choices are prepared for settings of image processing and can be selected by the user in order to meet various printing purposes of the user. These settings can be made as print setting options via the operation unit of the printer driver or controller.

An example of items whose settings can be changed as print setting options is switching of the halftone screen. As a characteristic of the halftone, a high-LPI halftone is suitable for a text and a graphic image mainly formed from a line art, whereas a low-LPI halftone is suitable for an image such as a photographic image. The user can select the halftone in accordance with the pattern of an image to be printed. The output characteristic changes between a high LPI and a low LPI.

An image to be printed may change depending on selected items associated with the print engine out of items selected by the user as print setting options, in addition to settings of image processing. For example, various sheets are used for printing, and even paper varies in thickness and texture. An image to be printed changes greatly depending on what kind of print medium is used.

Some electrophotographic color printers are equipped with a glossiness control function for controlling the fusibility of toner on a sheet by changing the fixing speed in fusion and thermal fixing. If the glossiness is controlled in accordance with an instruction from the user via the printer driver, not only the glossiness but also the density and color reproducibility generally change.

As described above, the color printer may change the density and color of an image to be printed depending on the setting contents of the above-mentioned setting items out of print setting options. However, a purpose of these setting items is not to intentionally adjust the tint, unlike a color tone correction function, monitor matching function, and ink color simulation function. For this reason, it is ideal to obtain color reproducibility which always exhibits a constant density and color regardless of setting contents.

A conventional calibration technique can generate a correction LUT (Look Up Table) for correcting a tint difference caused by a setting difference in print setting options except options for intentionally adjusting the tint.

For example, there is a technique of correcting a tint difference caused by a difference in halftone screen. According to this technique, all halftone screens installed in the print engine are sequentially designated to print measurement samples. The density of each color patch is measured to create a correction LUT for each halftone screen. Further, by designating a sheet tray in printing a measurement sample for correcting a halftone screen, a correction LUT obtained by measuring a measurement sample can be prepared for each combination of a sheet tray and halftone screen (see U.S. Pat. No. 5,936,741).

However, according to this conventional technique, correction LUTs for correcting a tint difference caused by a setting difference in print setting options except options for intentionally adjusting the tint must be prepared by the number of all combinations of choices of print setting options to be set. If the number of print setting options to be set is increased, the number of combinations greatly increases. It becomes cumbersome to perform calibration operation for all necessary combinations.

In order to obtain an appropriate calibration effect in print operation, the user must select a proper one of many correction LUTs. It becomes very difficult to select a proper correction LUT when the number of correction LUTs is extremely large. For this reason, it is substantially impossible to correct the tint for print setting options except options for intentionally adjusting many tints.

In print operation, the user must select a proper correction LUT in accordance with a combination of selected print setting options. If, however, the number of correction LUTs is large, an improper correction LUT may be designated and applied, undesirably varying the tint.

SUMMARY OF THE INVENTION

The present invention has been made to overcome the conventional drawbacks, and has as its object to reduce the work load of generating a correction LUT used to correct the tint and facilitate setting work when the tint is corrected using the generated correction LUT.

To achieve the above object, an image forming system according to the present invention comprises the following arrangement.

That is, an image forming system comprising an information processing apparatus which converts document data into print job information and transmits the print job information, and an image forming apparatus which receives the transmitted print job information, and when rasterizing the print job information into a raster image and printing the raster image, corrects the raster image by using a correction table held in advance, the information processing apparatus comprising an acquisition unit configured to acquire information on a type and a size of a printing medium which is set in each sheet tray of the image forming apparatus, a display unit configured to display, in correspondence with the sheet tray, the type and the size of the printing medium that are acquired by the acquisition unit, and a selection unit configured to select one of a plurality of sheet trays displayed by the display unit, and the image forming apparatus comprising a measurement image printing unit configured to print a measurement image which is obtained by measuring a printing result upon printing by a predetermined measurement unit and is used to generate the correction table, wherein the measurement image printing unit prints the measurement image at the type and the size of the printing medium corresponding to the sheet tray selected by the selection unit.

The present invention can reduce the work load of generating a correction LUT used to correct the tint, and facilitate setting work when the tint is corrected using the generated correction LUT.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

<Flow of Calibration Processing>

Figure 1:
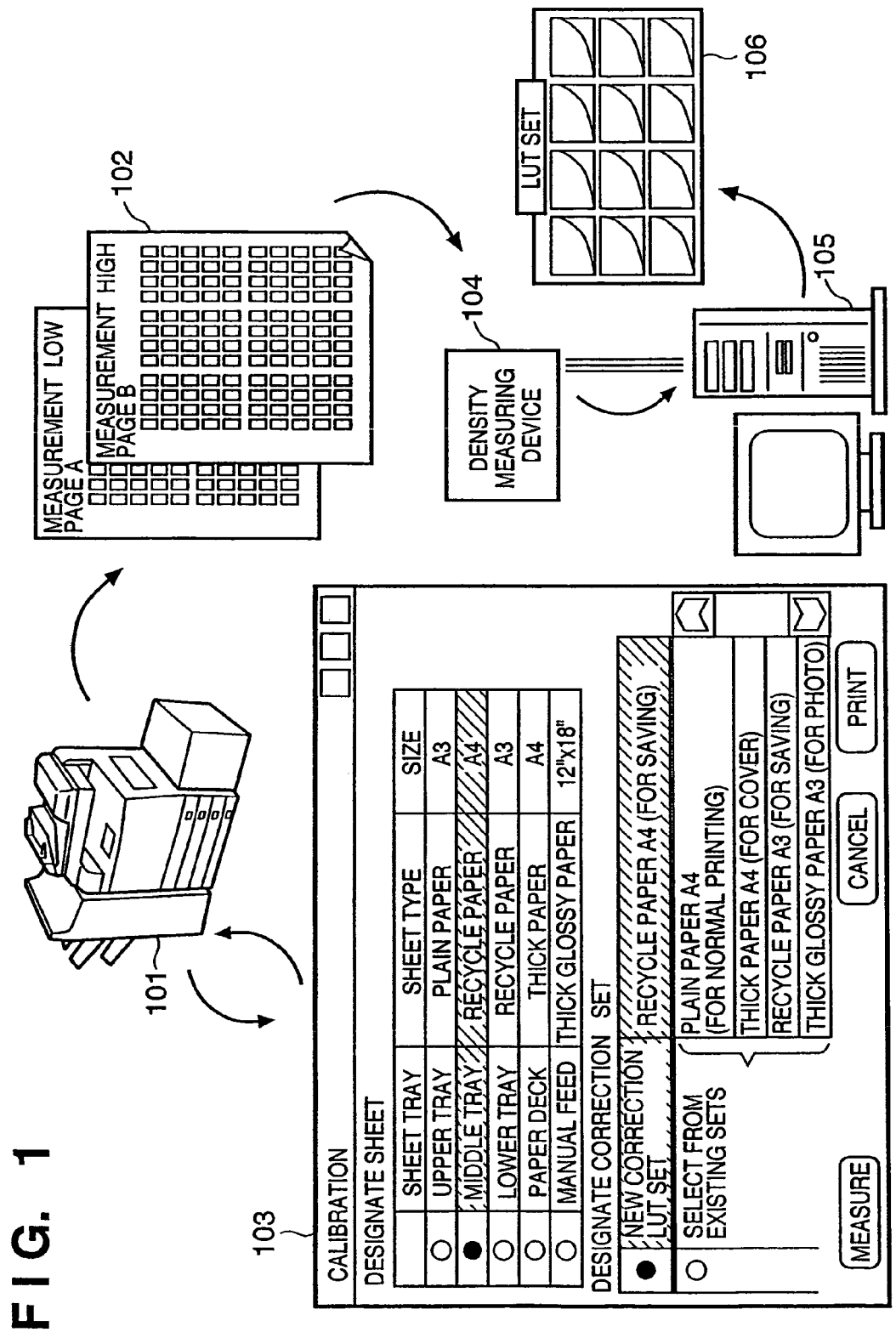
FIG. 1 is a schematic view showing the flow of calibration processing of an image forming apparatus (digital color multi-functional peripheral 101) according to the first embodiment of the present invention.
Figure 2:
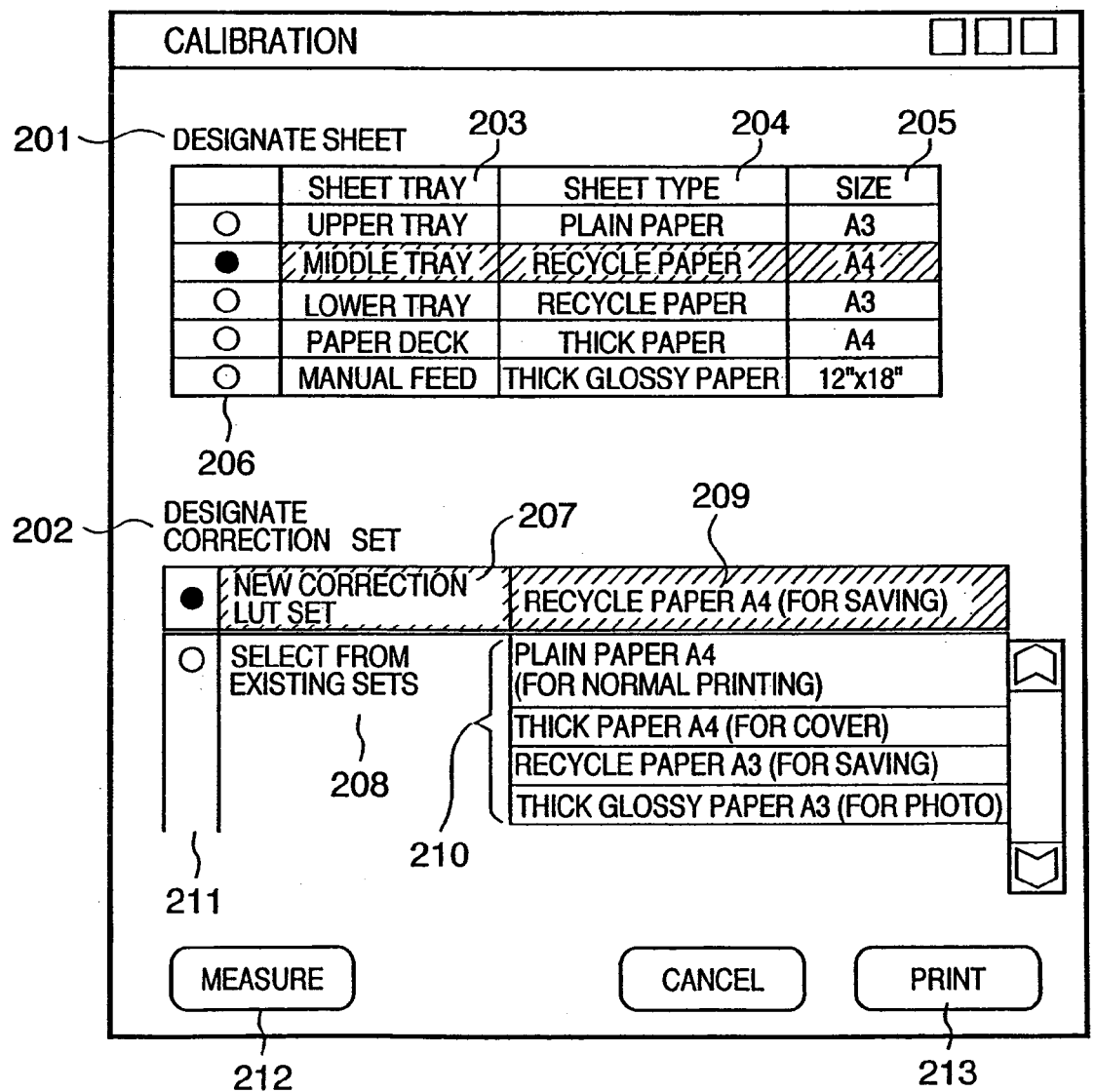
FIG. 2 is a view showing the UI of utility software used to execute calibration in the digital color multi-functional peripheral.
Figure 3:
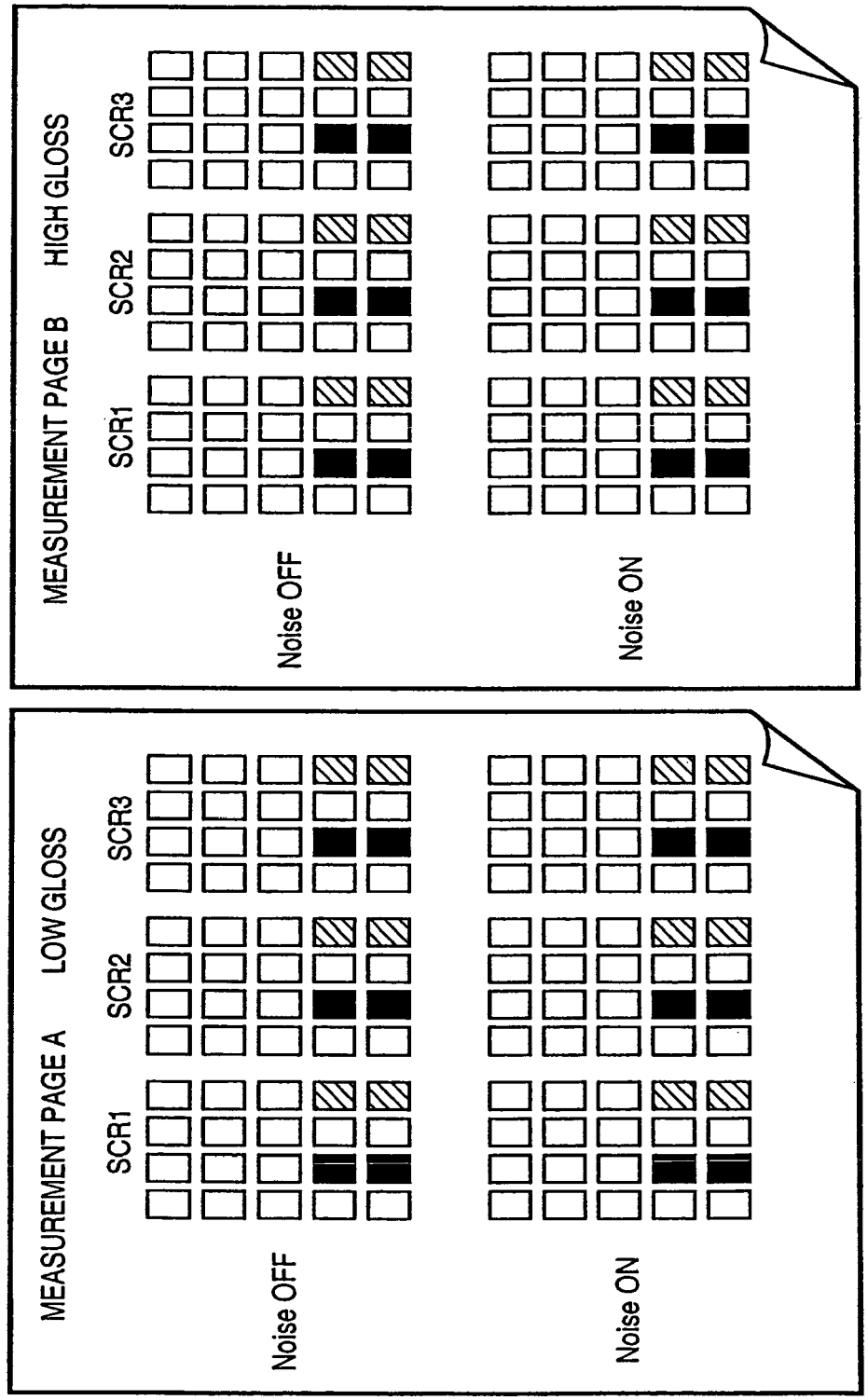
FIG. 3 is a view showing the layout of measurement pages.
Figure 4:
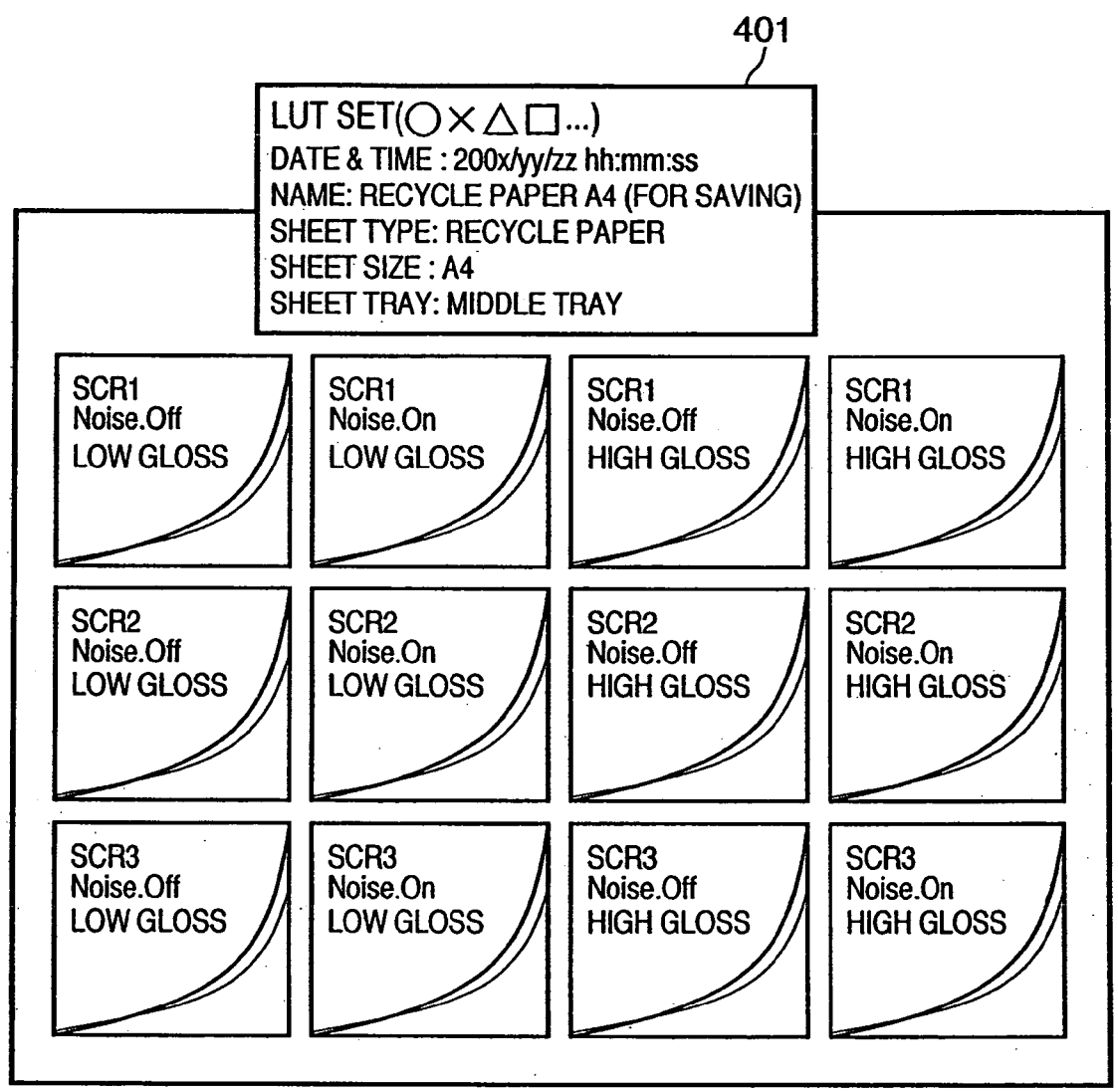
FIG. 4 is a view showing a correction LUT set.

FIG. 1 is a schematic view showing the flow of calibration processing of an image forming apparatus (digital color multi-functional peripheral 101) according to the first embodiment of the present invention. FIG. 2 is a view showing the UI (User Interface) of utility software used to execute calibration in the digital color multi-functional peripheral 101. FIG. 3 is a view showing the layout of measurement pages (measurement images) which are obtained by measuring a printing result by a density measuring device upon printing and are used to generate a correction LUT. FIG. 4 is a view showing a correction LUT set. Details of calibration processing in the digital color multi-functional peripheral 101 will be explained with reference to FIGS. 1 to 4.

In FIG. 1, the digital color multi-functional peripheral 101 comprises a controller. Reference numeral 102 denotes a measurement page; 103, calibration utility software; 104, a density measuring device; 105, a host computer; and 106, a correction LUT set.

Execution of calibration will be explained in due order. The calibration utility software 103 is activated in the host computer 105. The calibration utility software 103 communicates with the digital color multi-functional peripheral 101, acquires necessary information, and displays the acquired information.

The user designates a necessary item on the calibration utility software 103 and clicks a print button (213 in FIG. 2). Then, the digital color multi-functional peripheral 101 prints the measurement page 102.

As shown in FIG. 2, print setting options for the measurement page 102 that are designated on the UI of the calibration utility software include sheet designation (201) and a correction LUT set (202). The type (204) and size (205) of a sheet (printing medium) set in each sheet tray (203) are acquired by the calibration utility software 103 by communicating with the digital color multi-functional peripheral 101. The user selects a sheet tray in a selection column 206, and can simultaneously select a sheet type and size.

As designation of the correction LUT set (202), the user selects either of "new correction LUT set" (207) for newly creating a correction LUT set and "select from existing sets" (208) for selecting one of existing correction LUT sets. When the user selects "new correction LUT set" (207) in a selection column 211, he must newly input an arbitrary name of a correction LUT set on the UI (209). When the user selects "select from existing sets" (208), he selects a correction LUT set from a list of created correction LUT sets which are acquired by the calibration utility software 103 by communicating with the controller of the digital color multi-functional peripheral 101. However, the name of a correction LUT set can be arbitrarily changed.

The measurement page 102 is printed using a sheet tray complying with the sheet designation (201). Details of the measurement page 102 are shown in FIG. 3. As shown in FIG. 3, the first page (measurement page A) is output in a low-gloss mode, and the second page (measurement page B) is output in a high-gloss mode. On each measurement page 102, C, M, Y, and K tone patches are laid out two by two for each of three halftone screens (SCR1, SCR2, and SCR3) of the digital color multi-functional peripheral 101. Further, patches in each color are printed with random noise (Noise On) and without random noise (Noise Off).

The three halftone screens are low-LPI SCR1, intermediate-LPI SCR2, and high-LPI SCR3. These halftone screens can be selected in accordance with the user's purpose such that a low-LPI halftone screen is selected to print a photograph or the like in order to give priority to tonality, a high-LPI halftone screen is selected to print a line art or text in order to give priority to reproducibility, and an intermediate-LPI halftone screen is selected to balance tonality and reproducibility. However, the tint changes depending on the tonality and color mixing of each halftone screen.

Random noise can be applied to an image to reduce banding which is generated in gradations of a printed image. Whether to apply random noise can be selected in accordance with the printing purpose such as a pattern. When, however, random noise is applied, the tonality and the tint based on color mixing change.

The gloss mode includes low-gloss reproduction and high-gloss reproduction, and can be switched between them even with a sheet of the same type by changing the degree of fusion of toner upon a change in the fixing speed of the digital color multi-functional peripheral. However, the tonality and tint change depending on the glossiness. Setting of the halftone screen, setting of whether to apply random noise, and setting of the gloss mode are print setting options except options for intentionally adjusting the tint.

The measurement page 102 is set in the density measuring device 104 connected to the host computer 105, and the user clicks a "measurement" button (212 in FIG. 2) on the calibration utility software 103. Then, the densities of color patches laid out on the measurement page 102 are measured and input to the host computer 105 to generate a correction LUT for each color patch group.

Generated correction LUTs are stored at once in the correction LUT set 106 which is designated when the measurement page is printed (details of the correction LUT set 106 are shown in FIG. 4). At the same time, the correction LUT set is assigned with the date and time of executing calibration and detailed information ("attribute information") upon printing a measurement page (details are represented by 401 in FIG. 4). The correction LUT set 106 is finally stored in the controller in the digital color multi-functional peripheral 101. Then, calibration processing ends.

<Flow of Print Operation>

Figure 5A:
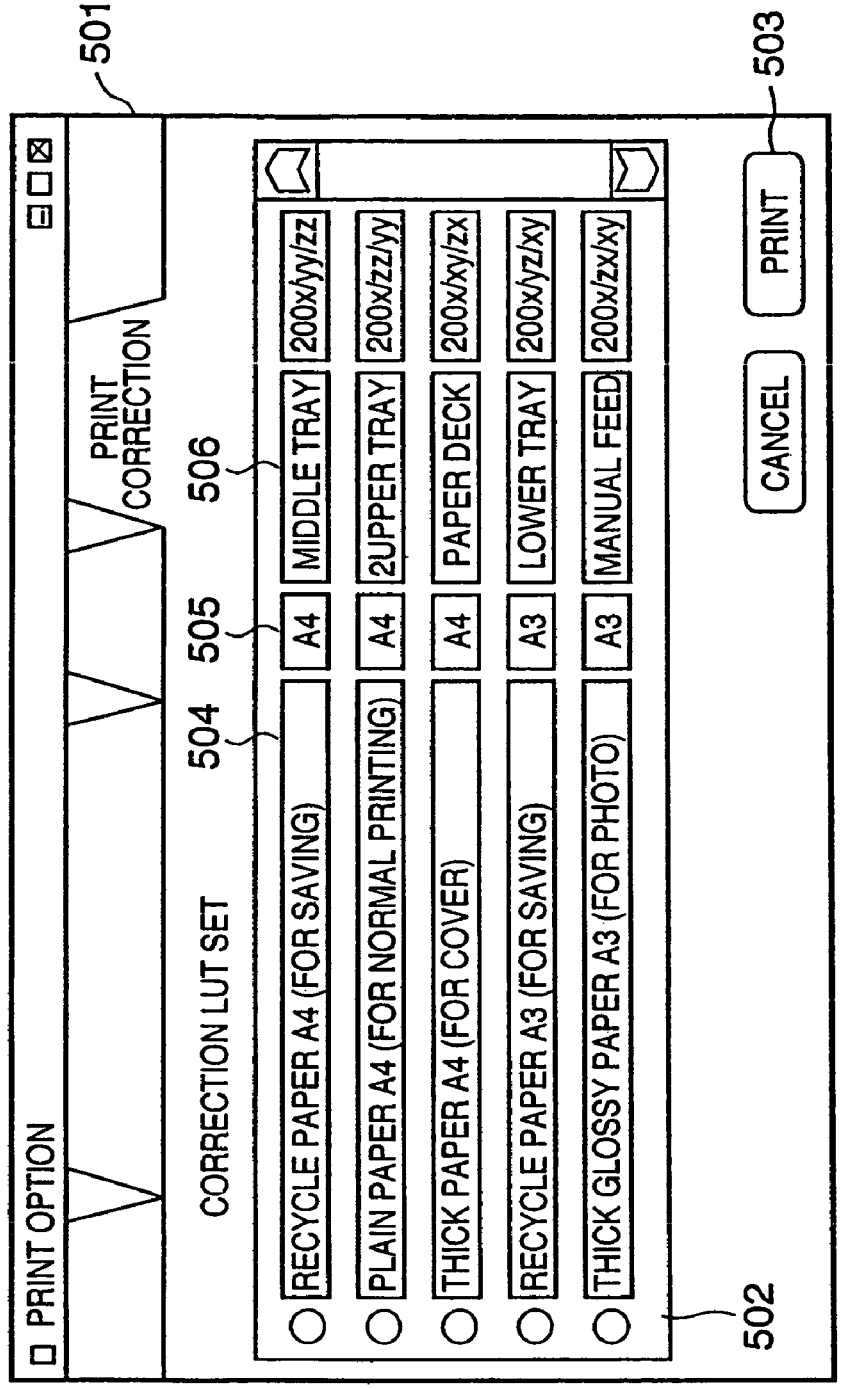
FIGS. 5A and 5B are views showing the UI of a printer driver used in printing.
Figure 5B:
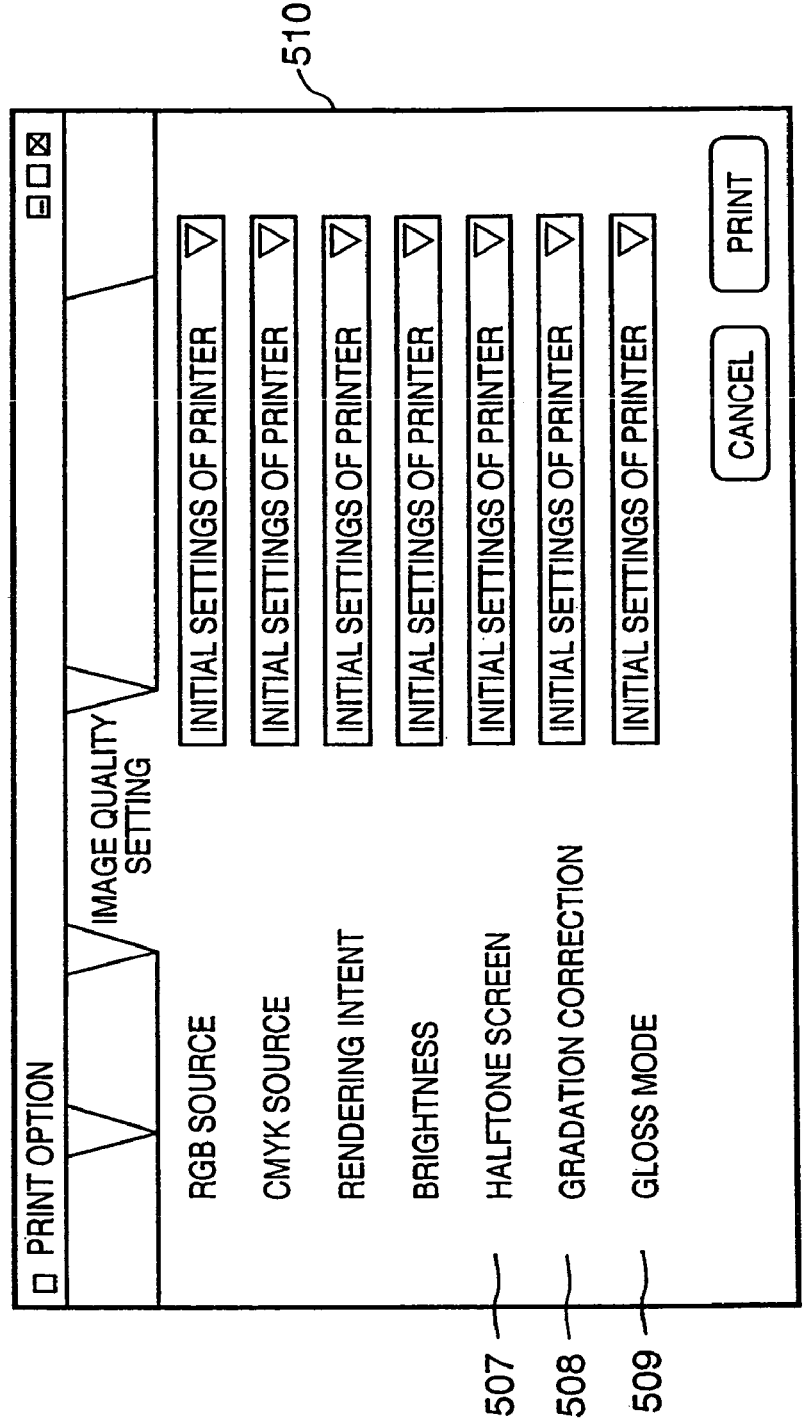

The flow of processing when print processing is executed using a generated correction LUT set will be explained. FIGS. 5A and 5B are views showing the UI of a printer driver used in printing. In print processing, as shown in FIG. 5A, the correction LUT set 106 can be selected as a print setting option via a UI 501 of the printer driver. The printer driver communicates with the digital color multi-functional peripheral 101, acquires correction LUT information, and displays calibration information assigned to each correction LUT set on the UI 501. The user selects a desired correction LUT set from a selection column 502 while referring to the pieces of information.

In the first embodiment, the user suffices to select a correction LUT set and click a print button 503, and need not separately execute sheet setting. A print job is generated on the basis of settings of a sheet tray 506, size 505, and sheet type 504 which are assigned to the selected correction LUT set. As represented by a printer driver UI 510 in FIG. 5B, print setting options for setting the image quality can also be set from another tab. As for items of a halftone screen 507, gradation correction 508, and gloss mode 509, a print job is generated in accordance with selected print setting options.

In print operation, when the user clicks the print button 503 on the printer driver UI 501, the printer driver generates a print job and sends it to the digital color multi-functional peripheral 101. The controller of the digital color multi-functional peripheral 101 performs designated image processing in RIP, and at the same time executes calibration based on each correction LUT included in the designated correction LUT set. Then, a sheet determined by a sheet setting corresponding to a selected correction LUT is used. The printer driver performs image processing in accordance with a gloss mode and gradation correction ON/OFF state corresponding to the selected correction LUT, and executes printing.

As described above, according to the first embodiment, the user suffices to designate only a sheet tray and correction LUT set when a measurement page is printed in executing calibration. Also, the user suffices to designate a correction LUT set in print operation. Even when a halftone screen, gradation correction, and gloss mode serving as print setting options for setting the image quality are arbitrarily set, printing using a halftone screen, gradation correction, and gloss mode which comply with a selected correction LUT can be achieved.

Second Embodiment

In the first embodiment, a correction LUT set is designated in print operation. The present invention is not limited to this, and an optimal correction LUT set can also be selected by setting a sheet and image quality. Details of the second embodiment will be described with reference to FIGS. 6A, 6B, 7, and 8.

Figure 6A:
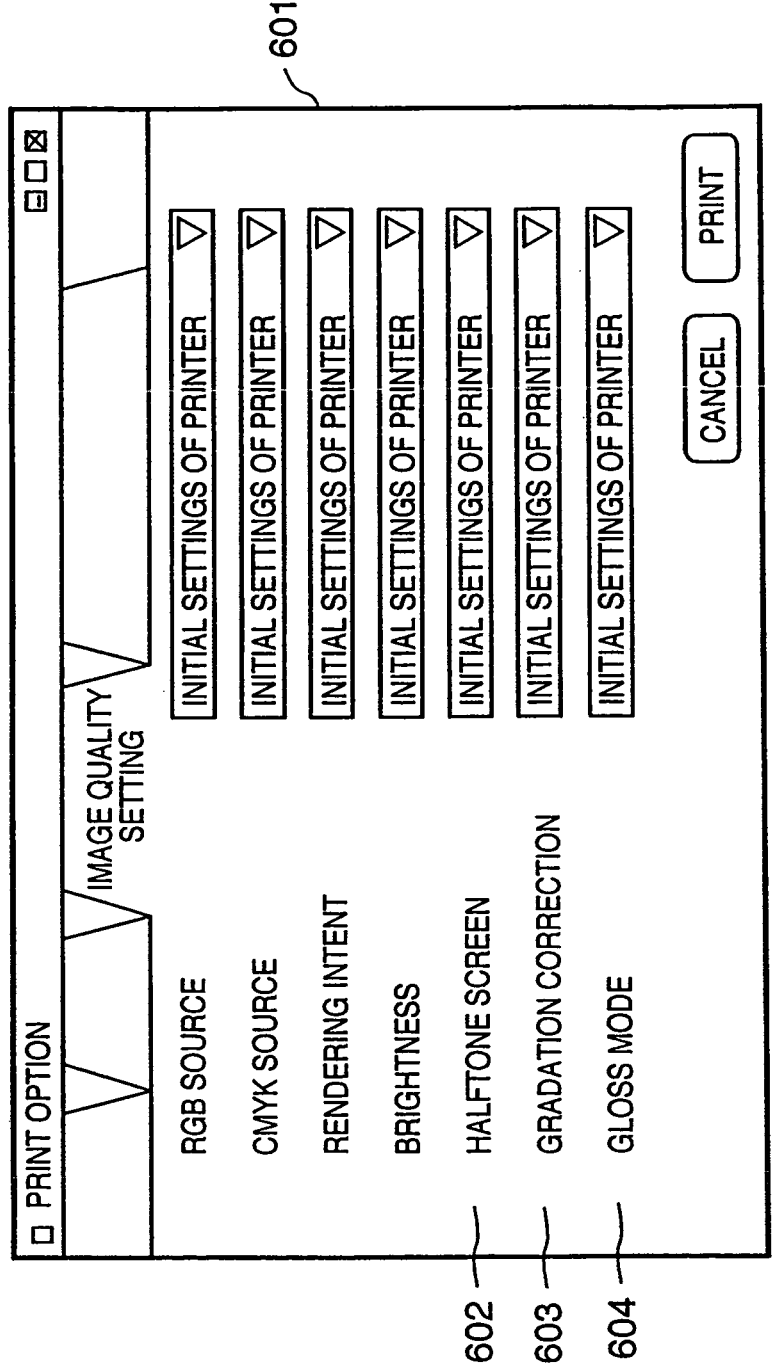
FIGS. 6A and 6B are views showing the UI of a printer driver in a digital color multi-functional peripheral according to the second to fifth embodiments of the present invention.
Figure 6B:
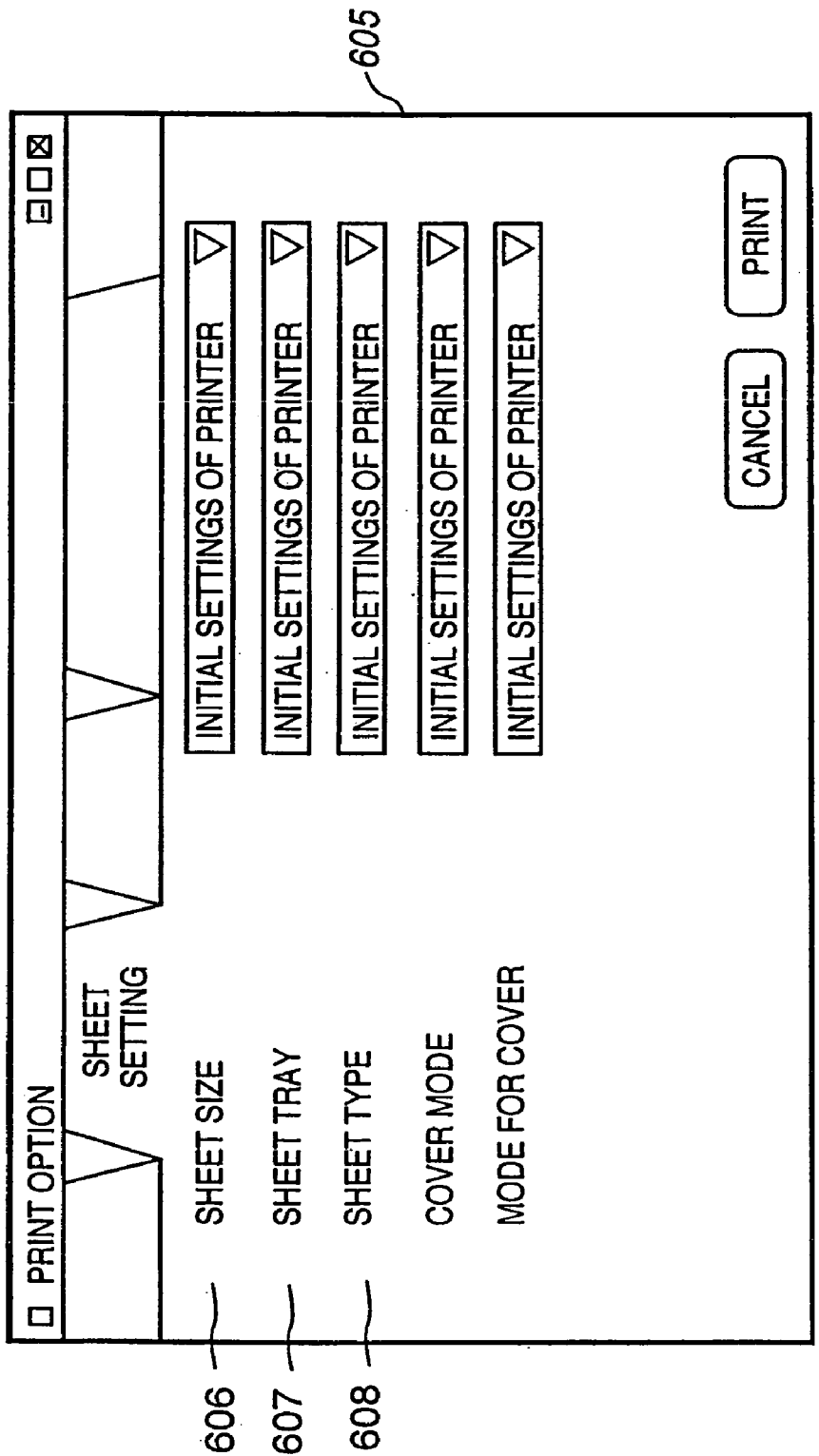
Figure 7:
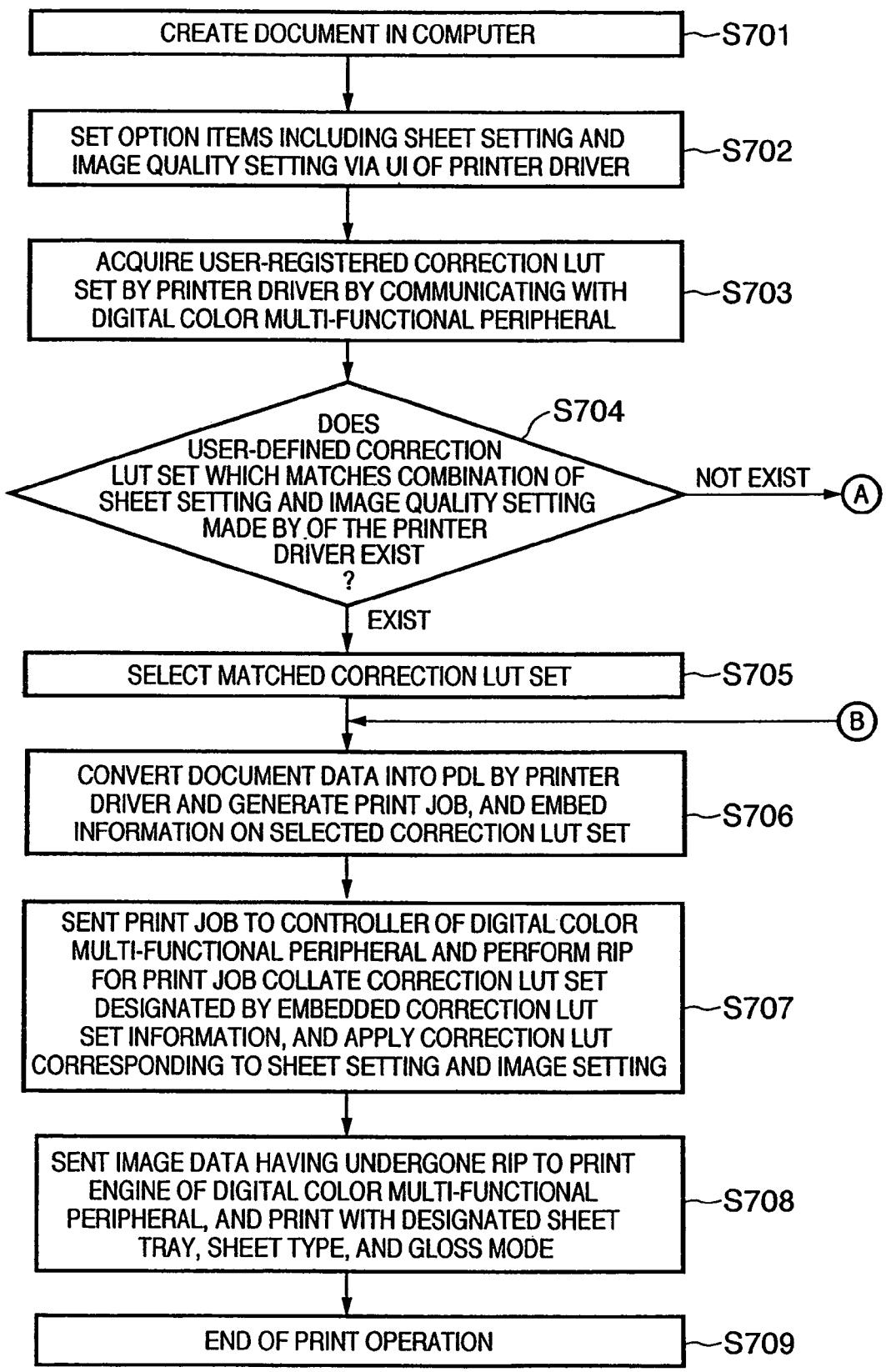
FIG. 7 is a flowchart showing the flow of processing in print operation in the digital color multi-functional peripheral according to the second to fifth embodiments of the present invention.
Figure 8:
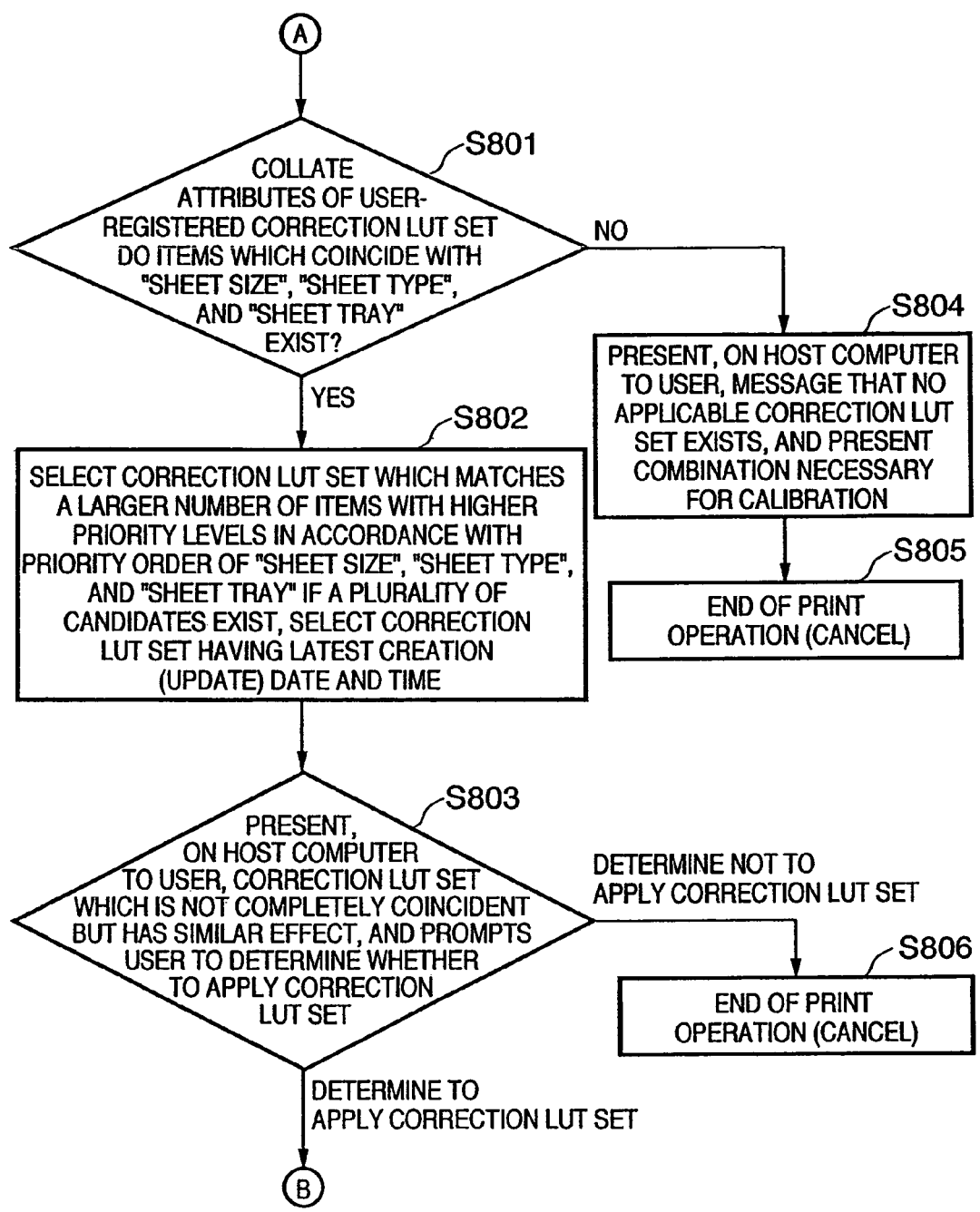
FIG. 8 is a flowchart showing the flow of processing in print operation in the digital color multi-functional peripheral according to the second embodiment of the present invention.

FIGS. 6A and 6B are views showing the UI of a printer driver in a digital color multi-functional peripheral according to the second embodiment of the present invention. FIGS. 7 and 8 are flowcharts showing the flow of printing in print operation. The second embodiment assumes that calibration is done by the same procedures as those in the first embodiment, and a correction LUT set 106 is prepared in the digital color multi-functional peripheral.

The procedures of print operation will be explained with reference to FIG. 7. In step S701, the user creates document data on application software in a host computer. In step S702, the user sets print setting options including a sheet setting and image quality setting via the UI of the printer driver. As shown in FIGS. 6A and 6B, the UIs of the image quality setting and sheet setting include items irrespective of attribute information of the correction LUT set 106. In the second embodiment, influential items of image quality setting (601) are "halftone screen" (602), "gradation correction" (603), and "gloss mode" (604). Influential items of sheet setting (605) are "sheet size" (606), "sheet tray" (607), and "sheet type" (608).

In step S703, the printer driver communicates with a digital color multi-functional peripheral 101, and acquires user-registered correction LUT set information. In step S704, it is determined whether a correction LUT set containing attribute information which matches the items of the sheet setting and image quality setting made by the user via the UI of the printer driver exists.

If it is determined in step S704 that no matched correction LUT set exists, the flow advances to step S801 in FIG. 8. In step S801, attribute information of the user-registered correction LUT set is finely collated to determine whether even one item of the attribute information coincides with "sheet size" (606), "sheet type" (608), or "sheet tray" (607).

If it is determined in step S801 that no coincident item exists, the flow advances to step S804. If no applicable correction LUT set exists, items which newly require calibration are presented on the basis of items set via the UI of the printer driver. Then, print operation is canceled and ends (step S805).

If it is determined in step S801 that one or more coincident items exist, the flow advances to step S802. A correction LUT set which matches a larger number of items with higher priority levels is selected in accordance with a predetermined priority order of "sheet size" (606), "sheet type" (608), and "sheet tray" (607). If a plurality of candidates exist at the same priority level, a correction LUT set having the latest creation (update) date and time is selected.

In step S803, a host computer 105 presents to the user a message "no completely coincident correction LUT set exists, but a correction LUT set having a similar effect exists", and prompts the user to determine whether to apply the correction LUT set. If the user determines not to apply any correction LUT set, the flow advances to step S806, and print operation is canceled and ends. If the user determines to apply the correction LUT set, the flow returns to step S706 of FIG. 7.

If it is determined in step S704 that a correction LUT set containing attribute information which matches the items of the sheet setting and image quality setting made by the user via the UI of the printer driver exists, the flow advances to step S705. Then, the matched correction LUT set is selected.

In step S706, the printer driver generates a print job described in the PDL on the basis of document data. At this time, information on the selected correction LUT set is embedded in the print job.

In step S707, the generated print job is sent to the controller of the digital color multi-functional peripheral 101, and undergoes RIP. A correction LUT set designated by the embedded correction LUT set information is collated in the digital color multi-functional peripheral 101, and a correction LUT which is contained in the correction LUT set and matches the sheet setting and image setting is applied.

In step S708, bitmap data having undergone RIP is sent to the print engine of the digital color multi functional peripheral 101, and actually printed with the designated sheet tray, sheet type, and gloss mode. After that, print processing ends (step S709).

As is apparent from the above description, according to the second embodiment, the user can automatically select an optimal correction LUT set by simply inputting a sheet setting and image quality setting via the UI of the printer driver in accordance with the printing purpose.

Even when a correction LUT set which corresponds to the sheet setting and image quality setting input via the UI of the printer driver does not exist, correction LUT sets are sequentially selected in accordance with predetermined priority from one which least poses a problem. The user who executes print operation need not learn complicated operation which has conventionally been necessary to obtain the calibration effect. The user can select a correction LUT set capable of minimizing differences in sheet setting and image quality setting, and execute printing. Alternatively, the user can select a correction LUT set capable of minimizing a difference in gloss mode, and execute printing. When no optimal correction LUT exists, the user can select cancellation of printing itself.

Third Embodiment

Figure 9:
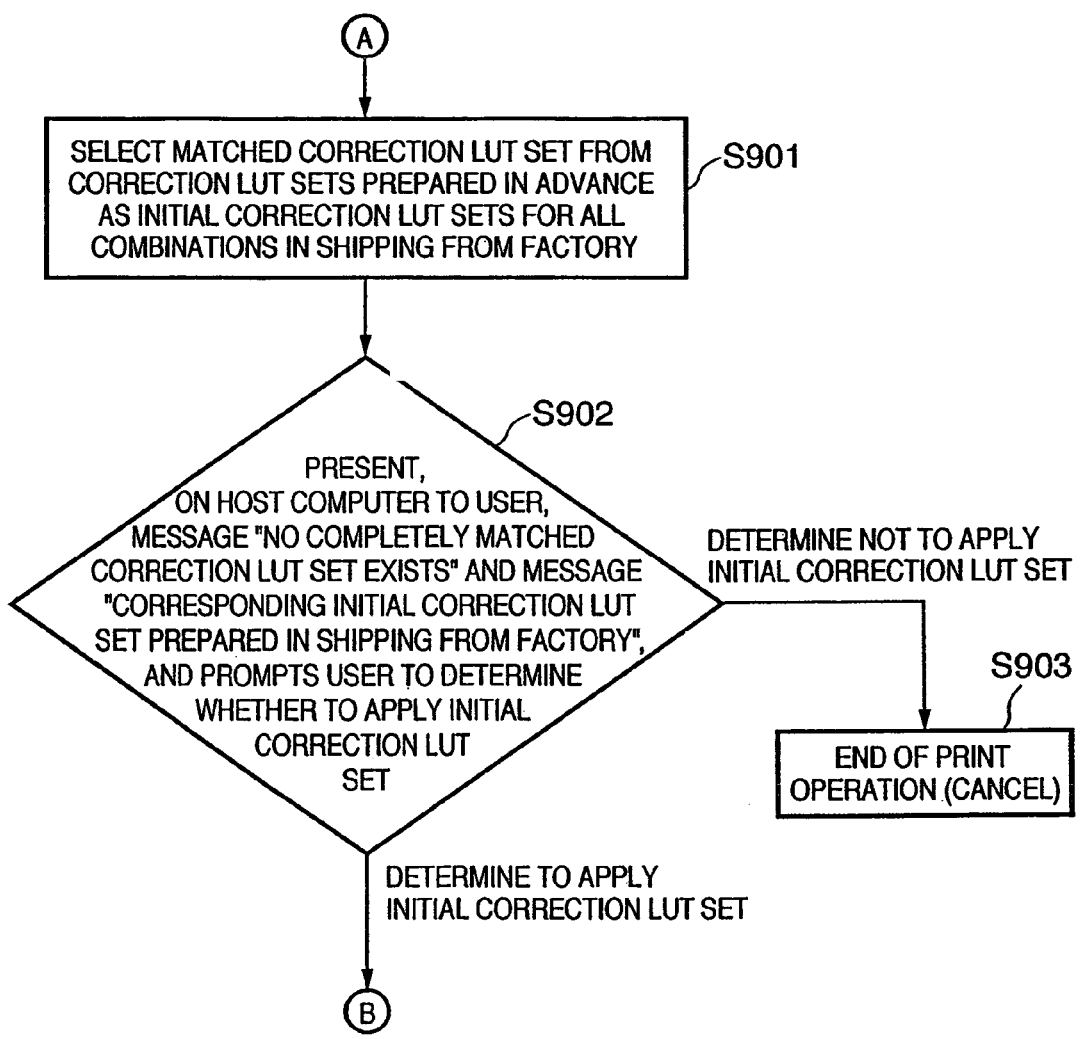
FIG. 9 is a flowchart showing the flow of processing in print operation in the digital color multi-functional peripheral according to the third embodiment of the present invention.

In the second embodiment, when a correction LUT set which corresponds to a sheet setting and image quality setting input via the UI of the printer driver does not exist, correction LUT sets are sequentially selected in accordance with predetermined priority from one which least poses a problem. However, the present invention is not limited to this. For example, an initial correction LUT set which is prepared in advance in shipping from the factory may be selected. Details of the third embodiment will be described with reference to FIGS. 6A, 6B, 7, and 9. FIG. 9 is a flowchart showing the flow of processing for selecting a correction LUT set when a correction LUT set which matches a sheet setting and image quality setting made via the UI of the printer driver does not exist in print operation.

In a digital color multi-functional peripheral according to the third embodiment, correction LUT sets corresponding to all combinations of sheet settings and image settings are prepared in advance in shipping from the factory (factory-default), and held in the controller. A correction LUT set which is generated by performing calibration by the same procedures as those in the first embodiment is also prepared.

The procedures of print operation will be explained with reference to FIG. 7. In step S701, the user creates document data on application software in a host computer. In step S702, the user sets print setting options including a sheet setting and image quality setting via the UI of the printer driver. As shown in FIGS. 6A and 6B, the UIs of the image quality setting and sheet setting include items irrespective of attribute information of a correction LUT set 106. In the third embodiment, influential items of image quality setting (601) are "halftone screen" (602), "gradation correction" (603), and "gloss mode" (604). Influential items of sheet setting (605) are "sheet size" (606), "sheet tray" (607), and "sheet type" (608).

In step S703, the printer driver communicates with a digital color multi-functional peripheral 101, and acquires user-registered correction LUT set information. In step S704, it is determined whether a correction LUT set containing attribute information which matches the items of the sheet setting and image quality setting made by the user via the UI of the printer driver exists.

If it is determined in step S704 that no matched correction LUT set exists, the flow advances to step S901 in FIG. 9. As described above, in the digital color multi-functional peripheral according to the third embodiment, initial correction LUT sets are prepared in advance for all combinations in shipping from the factory. Thus, in step S901, a matched correction LUT sets is selected from the prepared initial correction LUT sets.

In step S902, a host computer 105 presents to the user a message "no completely coincident correction LUT set exists, but an initial correction LUT set prepared in shipping from the factory exists as a correction LUT set having a similar effect". The host computer 105 prompts the user to determine whether to apply the initial correction LUT sets.

If the user determines in step S902 not to apply any initial correction LUT, the flow advances to step S903, and print operation is canceled and ends. If the user determines to apply the initial correction LUT, the flow returns to step S706 of FIG. 7.

If it is determined in step S704 that a correction LUT set containing attribute information which matches the items of the sheet setting and image quality setting made by the user via the UI of the printer driver exists, the flow advances to step S705. Then, the matched correction LUT set is selected.

In step S706, the printer driver generates a print job described in the PDL on the basis of document data. At this time, information on the selected correction LUT set is embedded in the print job.

In step S707, the generated print job is sent to the controller of the digital color multi-functional peripheral 101, and undergoes RIP. A correction LUT set designated by the embedded correction LUT set information is collated in the digital color multi-functional peripheral 101, and a correction LUT which is contained in the correction LUT set and matches the sheet setting and image setting is applied.

In step S708, bitmap data having undergone RIP is sent to the print engine of the digital color multi-functional peripheral 101, and actually printed with the designated sheet tray, sheet type, and gloss mode. Thereafter, print processing ends (step S709).

As is apparent from the above description, according to the third embodiment, the user can automatically select an optimal correction LUT set by simply inputting a sheet setting and image quality setting via the UI of the printer driver in accordance with the printing purpose.

Even when a correction LUT set which corresponds to the sheet setting and image quality setting input via the UI of the printer driver does not exist, a matched correction LUT sets is selected from the prepared initial correction LUT sets prepared in advance in shipping from the factory. The user who executes print operation need not learn complicated operation which has conventionally been necessary to obtain the calibration effect. The user can select an initial correction LUT in shipping from the factory that absorbs differences in sheet setting and image quality setting, and execute printing. Alternatively, the user can select an initial correction LUT in shipping from the factory that absorbs a difference in gloss mode, and execute printing. When no optimal correction LUT exists, the user can select cancellation of printing itself.

Fourth Embodiment

Figure 10:
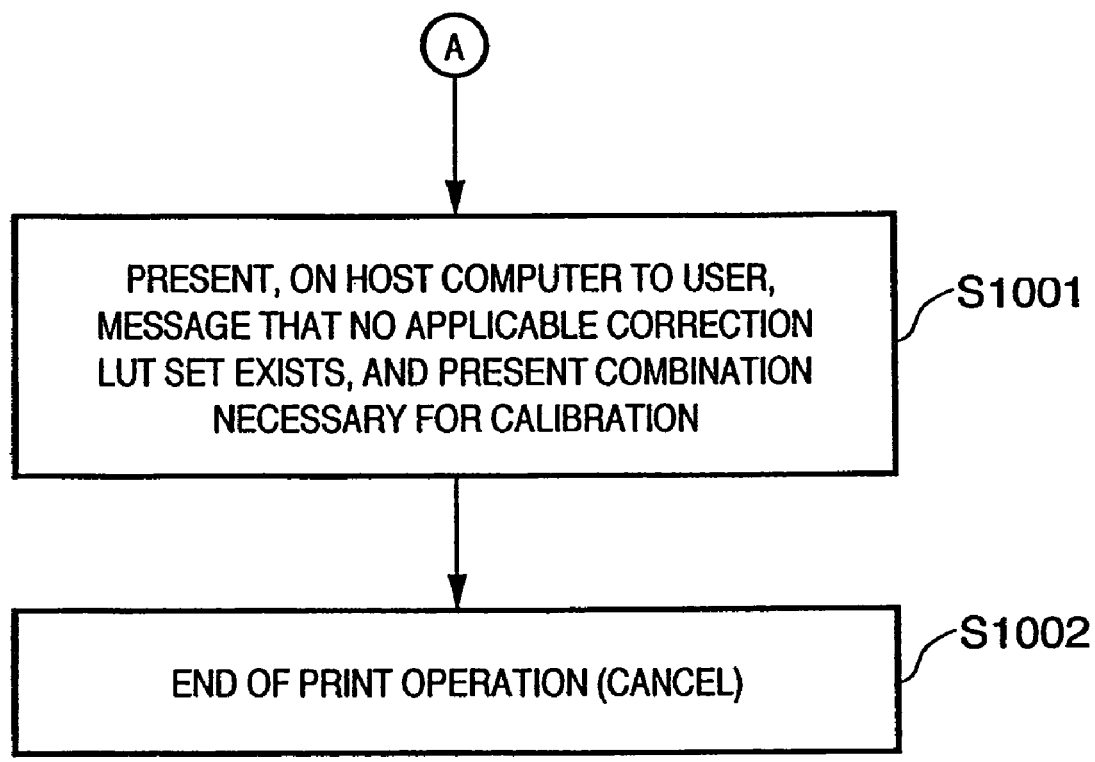
FIG. 10 is a flowchart showing the flow of processing in print operation in the digital color multi-functional peripheral according to the fourth embodiment of the present invention.

In the second and third embodiments, print operation ends when a correction LUT set which matches a sheet setting and image quality setting input via the UI of the printer driver does not exist, and the user determines not to apply any alternative correction LUT. However, the present invention is not limited to this. For example, print operation may end after a combination of a sheet setting and image quality setting necessary for calibration is presented to the user. Details of the fourth embodiment will be explained with reference to FIGS. 6A, 6B, 7, and 10. FIG. 10 is a flowchart showing the flow of processing when a correction LUT set which matches a sheet setting and image quality setting made via the UI of the printer driver does not exist in print operation. In a digital multi-functional peripheral according to the fourth embodiment, a correction LUT set which is obtained by performing calibration by the same procedures as those in the first embodiment is prepared. Further, correction LUT sets corresponding to all combinations of sheet settings and image settings are prepared in advance in shipping from the factory, and held in the controller.

The procedures of print operation will be explained with reference to FIG. 7. In step S701, the user creates document data on application software in a host computer. In step S702, the user sets print setting options including a sheet setting and image quality setting via the UI of the printer driver. As shown in FIGS. 6A and 6B, the UIs of the image quality setting and sheet setting include items irrespective of attribute information of a correction LUT set 106. In the fourth embodiment, influential items of image quality setting (601) are "halftone screen" (602), "gradation correction" (603), and "gloss mode" (604). Influential items of sheet setting (605) are "sheet size" (606), "sheet tray" (607), and "sheet type" (608).

In step S703, the printer driver communicates with a digital color multi-functional peripheral 101, and acquires user-registered correction LUT set information. In step S704, it is determined whether a correction LUT set containing attribute information which matches the items of the sheet setting and image quality setting made by the user via the UI of the printer driver exists.

If it is determined in step S704 that no matched correction LUT set exists, the flow advances to step S1001 in FIG. 10. In step S1001, a host computer 105 presents, to the user, messages "no applicable correction LUT set exists" and "a combination of a sheet setting and image quality setting necessary for calibration". The host computer 105 prompts the user to newly execute calibration, and ends (cancels) print operation (step S1002).

If it is determined in step S704 that a correction LUT set containing attribute information which matches the sheet setting and image quality setting made by the user via the UI of the printer driver exists, the flow advances to step S705. Then, the matched correction LUT set is selected.

In step S706, the printer driver generates a print job described in the PDL on the basis of document data. At this time, information on the selected correction LUT set is embedded in the print job.

In step S707, the generated print job is sent to the controller of the digital color multi-functional peripheral 101, and undergoes RIP. A correction LUT set designated by the embedded correction LUT set information is collated in the digital color multi-functional peripheral 101, and a correction LUT which is contained in the correction LUT set and matches the sheet setting and image setting is applied.

In step S708, bitmap data having undergone RIP is sent to the print engine of the digital color multi-functional peripheral 101, and actually printed with the designated sheet tray, sheet type, and gloss mode. Then, print processing ends (step S709).

As is apparent from the above description, according to the fourth embodiment, the user can automatically select an optimal correction LUT set by simply inputting a sheet setting and image quality setting via the UI of the printer driver in accordance with the printing purpose.

When a correction LUT set which corresponds to the sheet setting and image quality setting input via the UI of the printer driver does not exist, a combination of a sheet setting and image quality setting necessary for calibration is presented to the user, prompting the user to execute calibration.

Fifth Embodiment

Figure 11:
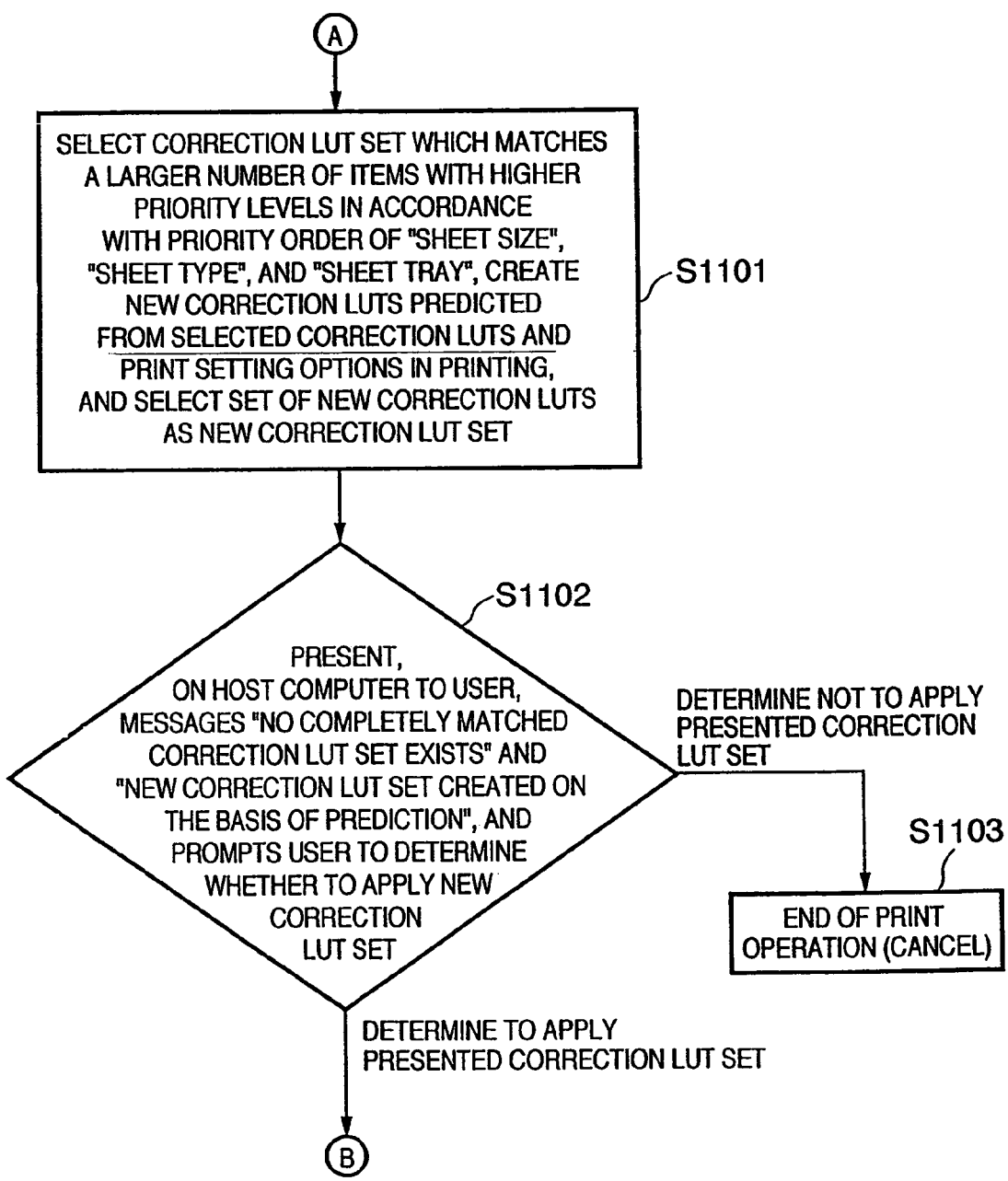
FIG. 11 is a flowchart showing the flow of processing in print operation in the digital color multi-functional peripheral according to the fifth embodiment of the present invention.

In the second and third embodiments, when a correction LUT set which corresponds to a sheet setting and image quality setting input via the UI of the printer driver does not exist, a correction LUT set which least poses a problem is selected from correction LUT sets which are held in advance. However, the present invention is not limited to this. A correction LUT set may be newly generated on the basis of correction LUTs which are held in advance, and the generated correction LUT set may be applied. Details of the fifth embodiment will be explained with reference to FIGS. 6A, 6B, 7, and 11. FIG. 11 is a flowchart showing the flow of processing of generating a correction LUT set when a correction LUT set which matches a sheet setting and image quality setting made via the UI of the printer driver does not exist in print operation. In a color multi-functional peripheral according to the fifth embodiment, a correction LUT set which is obtained by performing calibration by the same procedures as those in the first embodiment is prepared.

The procedures of print operation will be explained with reference to FIG. 7. In step S701, the user creates document data on application software in a host computer. In step S702, the user sets print setting options including a sheet setting and image quality setting via the UI of the printer driver. As shown in FIGS. 6A and 6B, the UIs of the image quality setting and sheet setting include items irrespective of attribute information of a correction LUT set. In the fifth embodiment, influential items of image quality setting (601) are "halftone screen" (602), "gradation correction" (603), and "gloss mode" (604). Influential items of sheet setting (605) are "sheet size" (606), "sheet tray" (607), and "sheet type" (608).

In step S703, the printer driver communicates with a digital color multi-functional peripheral 101, and acquires user-registered correction LUT set information. In step S704, it is determined whether a correction LUT set containing attribute information which matches the items of the sheet setting and image quality setting made by the user via the UI of the printer driver exists.

If it is determined in step S704 that no matched correction LUT set exists, the flow advances to step S1101 in FIG. 11. In step S1101, a correction LUT set which matches a larger number of items with higher priority levels is selected in accordance with a predetermined priority order of "sheet size", "sheet type", and "sheet tray" from user-defined correction LUT sets. New correction LUTs which are determined in accordance with setting contents made via the UI of the printer driver are created on the basis of respective correction LUTs of the selected correction LUT set. A combination of the new correction LUTs is selected as a new correction LUT set. The new correction LUT set is stored in the controller of the digital color multi-functional peripheral.

In step S1102, the host computer presents, to the user, messages "no completely coincident correction LUT set exists" and "alternatively created new correction LUT set". The host computer prompts the user to determine whether to apply the presented correction LUT set.

If the user determines in step S1102 not to apply the presented correction LUT set, print operation is canceled and ends (step S1103). If the user determines to apply the presented correction LUT set, the flow returns to step S706 of FIG. 7.

If it is determined in step S704 that a correction LUT set containing attribute information which matches the sheet setting and image quality setting made by the user via the UI of the printer driver exists, the flow advances to step S705. Then, the matched correction LUT set is selected.

In step S706, the printer driver generates a print job described in the PDL on the basis of document data. At this time, information on the selected correction LUT set is embedded in the print job.

In step S707, the generated print job is sent to the controller of the digital color multi-functional peripheral 101, and undergoes RIP. A correction LUT set designated by the embedded correction LUT set information is collated in the digital color multi-functional peripheral 101, and a correction LUT which is contained in the correction LUT set and matches the sheet setting and image setting is applied.

In step S708, bitmap data having undergone RIP is sent to the print engine of the digital color multi-functional peripheral 101, and actually printed with the designated sheet tray, sheet type, and gloss mode. Then, print processing ends (step S709).

This processing will be instantiated. For example, existing correction LUT sets are combinations: a) sheet size: A3, sheet type: plain paper, sheet tray: upper tray, b) sheet size: A3, sheet type: thick paper, sheet tray: lower tray, and c) sheet size: A3, sheet type: thick paper, sheet tray: upper tray. Only three correction LUT sets exist for these combinations. The priority is set to 1. sheet type, 2. sheet tray, and 3. sheet size.

Assume that, in printing a given job, settings "sheet size: A3, sheet type: plain paper, sheet tray: lower tray" are made in the driver with respect to the above settings. In this case, a correction LUT set which meets all these conditions does not exist among the three correction LUT sets. Hence, it is determined in accordance with the priority which of the correction LUT sets is desirable.

In this example, a) correction LUT set which coincides with the sheet type having the highest priority level is selected. Then, the difference between the job print settings in the driver and a) correction LUT set is determined. As a result, it is turned out that the sheet tray in a) correction LUT set is set to the upper tray, but the sheet tray in the job print settings is set to the lower tray.

Subsequently, settings in b) and c) correction LUT sets are confirmed. The difference between b) and c) is whether the sheet tray is the upper or lower tray. By checking the difference between b) and c) correction LUT values, the degree of "the difference between the upper and lower sheet trays" can be grasped.

This difference is reflected in the difference between a) and the print settings in the driver, thereby obtaining a higher-precision correction effect than that by a) preset correction LUT set.

How the difference between the upper and lower sheet trays influences the tint of a printout will be briefly explained. High printing quality is particularly requested of recent printing devices, especially printing devices which have high performance and high productivity and are used for commercial printing. These printing devices often use special sheets which have rarely been used in general office products. In order to stably print on various types of sheets, the environment of sheets themselves must be considered. For example, when a hygroscopic sheet is used, the sheet absorbs moisture in air in an environment where the humidity is high, and it becomes difficult to stably convey the sheet owing to curl (warpage of the sheet). In addition, toner which is transferred and fixed slightly changes depending on the water content of the sheet. Resultantly, the tint becomes different from one desired by the consumer or commercial print shop, or a printout becomes different from one in a dry environment.

In order to prevent this problem, an advanced printing device sometimes incorporates an air-conditioner in order to keep a sheet in a constant environment. The air-conditioner is often installed effectively for a specific cassette. The sheet characteristic changes between even sheet cassettes which store sheets of the same type, depending on whether the air-conditioner is installed for the sheet cassette (for example, the air-conditioner is installed for an upper cassette, but not for a lower cassette). The difference between sheet cassettes appears as a difference in tint. Thus, the present invention defines the sheet cassette as one of influential items.

As is apparent from the above description, according to the fifth embodiment, the user can automatically select an optimal correction LUT set by simply inputting a sheet setting and image quality setting via the UI of the printer driver in accordance with the printing purpose.

The fifth embodiment can cope with even a case wherein a correction LUT set which corresponds to the sheet setting and image quality setting input via the UI of the printer driver does not exist. That is, by applying a correction LUT set which is created on the basis of existing correction LUT sets, an optimal correction LUT which absorbs differences in sheet setting and image quality setting or a difference in gloss mode can be selected to execute printing.

Other Embodiment

The present invention may be applied to a system including a plurality of devices (e.g., a host computer, interface device, reader, and printer) or an apparatus including a single device (e.g., a copying machine or facsimile apparatus).

The object of the present invention is achieved even by supplying a storage medium which records software program codes to implement the function (page description data conversion function) of the above-described embodiments to the system or apparatus. In this case, the computer (or CPU or MPU) of the system or apparatus reads out and executes the program codes stored in the storage medium, thereby implementing the function (page description data conversion function). In this case, the storage medium which stores the program codes constitutes the present invention.

As the storage medium to supply the program codes, for example, a floppy® disk, hard disk, optical disk, magnetooptical disk, CD-ROM, CD-R, magnetic tape, nonvolatile memory card, or ROM can be used.

The function of the above-described embodiments is implemented when the readout program codes are executed by the computer. Also, the present invention includes a case wherein an OS (Operating System) or the like running on the computer performs some or all of actual processes on the basis of the instructions of the program codes and thereby implements the function of the above-described embodiments.

Furthermore, the present invention includes a case wherein the program codes read out from the storage medium are written in the memory of a function expansion board inserted into the computer or the memory of a function expansion unit connected to the computer and then the function of the above-described embodiments is implemented. That is, after the program codes are written in the memory, the CPU of the function expansion board or function expansion unit performs some or all of actual processes on the basis of the instructions of the program codes and thereby implements the function of the above-described embodiments.

The present invention is not limited to the above embodiments and various changes and modifications can be made within the spirit and scope of the present invention. Therefore to apprise the public of the scope of the present invention, the following claims are made.

Claim of Priority

This application claims priority from Japanese Patent Application No. 2004-355893 filed on Dec. 8, 2004, which is hereby incorporated by reference herein.

What is claimed is:

1. An information processing apparatus which transmits print job information to an image forming unit that receives the print job information, and when rasterizing the print job information into a raster image and printing the raster image, corrects the raster image by using a correction table held in advance, comprising:

an acquisition unit configured to acquire, from the image forming unit, information on the correction table that is associated with a type of sheet;

a setting unit configured to be able to set information on a sheet used to print the raster image; and a selection unit configured to compare information in the correction table acquired by said acquisition unit with the information on the sheet that is set by said setting unit, and select a correction table used to correct the raster image in accordance with predetermined priority when correction tables which match part of the information set by said setting unit exist, wherein, when a plurality of correction tables exist at the same priority level, in selecting a correction table in accordance with the predetermined priority said selection unit selects a correction table whose creation date and time or update date and time are later.

2. The apparatus according to claim 1, wherein said setting unit can further set information on an image quality used to print the raster image, and said selection unit selects the correction table on the basis of the information on the sheet and the information on the image quality.

3. The apparatus according to claim 1, wherein when a correction table which matches the information set by said setting unit does not exist, said selection unit presents setting information necessary to generate a correction table which matches the information.

4. The apparatus according to claim 1, wherein when a correction table which matches the information set by said setting unit does not exist, said selection unit selects an initial correction table which is prepared in advance.

5. An information processing method of transmitting print job information to an image forming unit which receives the print job information, and when rasterizing the print job information into a raster image and printing the raster image, corrects the raster image by using a correction table held in advance, the method being for application on an information processing apparatus and comprising:

an acquisition step of acquiring, from the image forming unit, information on the correction table that is associated with a type of sheet;

a setting step capable of setting information on a sheet used to print the raster image; and a selection step of comparing information in the correction table acquired in the acquisition step with the information on the sheet that is set in the setting step, and selecting, on the basis of a comparison result, a correction table used to correct the raster image in accordance with predetermined priority when correction tables which match part of the information set in the setting step exist, wherein, when a plurality of correction tables exist at the same priority level, in selecting a correction table in accordance with the predetermined priority, a correction table whose creation date and time or update date and time are later is selected.

6. The method according to claim 5, wherein in the setting step, information on an image quality used to print the raster image can be set, and in the selection step, the correction table is selected on the basis of the information on the sheet and the information on the image quality.

7. The method according to claim 5, wherein in the selection step, when a correction table which matches the information set in the setting step does not exist, setting information necessary to generate a correction table which matches the information is presented.

8. The method according to claim 5, wherein in the selection step, when a correction table which matches the information set in the setting step does not exist, an initial correction table which is prepared in advance is selected.

* * * * *